United States Patent
McGilvery

(10) Patent No.: US 10,184,220 B1
(45) Date of Patent: Jan. 22, 2019

(54) BOAT FENDER HOLDER

(71) Applicant: James R McGilvery, Tewksbury, MA (US)

(72) Inventor: James R McGilvery, Tewksbury, MA (US)

( * ) Notice: Subject to any disclaimer, the term of this patent is extended or adjusted under 35 U.S.C. 154(b) by 0 days.

(21) Appl. No.: 15/373,225

(22) Filed: Dec. 8, 2016

Related U.S. Application Data

(60) Provisional application No. 62/264,454, filed on Dec. 8, 2015.

(51) Int. Cl.
 *E02B 3/26* (2006.01)

(52) U.S. Cl.
 CPC ..................................... *E02B 3/26* (2013.01)

(58) Field of Classification Search
 CPC .............. E02B 3/26; E02B 3/24; B63B 59/02
 USPC ............ 405/212, 215, 216; 114/219, 230.26, 114/343, 364
 See application file for complete search history.

(56) References Cited

U.S. PATENT DOCUMENTS

| | | | | |
|---|---|---|---|---|
| 3,991,961 A | * | 11/1976 | Platzer, Jr. .......... | B65B 67/1205 248/231.71 |
| 4,281,610 A | * | 8/1981 | Young ...................... | E02B 3/26 114/219 |
| 4,664,053 A | * | 5/1987 | Mesinger .................. | E02B 3/26 114/219 |
| 4,843,994 A | * | 7/1989 | Wilson ...................... | E02B 3/26 114/219 |
| 5,074,506 A | * | 12/1991 | Larsen .................... | B63B 17/00 248/284.1 |
| 5,671,692 A | * | 9/1997 | Kimball .................. | B63B 59/02 114/219 |
| 6,349,661 B1 | * | 2/2002 | Dusek ....................... | E02B 3/26 114/219 |
| 2008/0000409 A1 | * | 1/2008 | Adams ...................... | E02B 3/26 114/219 |

FOREIGN PATENT DOCUMENTS

| | | | |
|---|---|---|---|
| FR | 2927096 | * | 2/2008 |
| JP | 5681704 | * | 7/1981 |
| JP | 04024311 | * | 1/1992 |

* cited by examiner

*Primary Examiner* — Carib A Oquendo

(74) *Attorney, Agent, or Firm* — David A. Chavous; Chavous Intellectual Property Law LLC

(57) ABSTRACT

This disclosure to boat fender holders for improving the protection of boats and docks against damage. Disclosed herein are boat fender holders comprising a holder portion and a lip portion, whereby the lip portion defines one or more holes that are configured to receive one or more fasteners.

15 Claims, 11 Drawing Sheets

BOAT FENDER HOLDER

FIELD

This disclosure relates generally to boat technology, particularly technology relating to docking equipment.

BACKGROUND

Boat fenders are necessary equipment to prevent damage to boats when docked. Waves tend to move docked boats into docks, potentially causing damage to both docks and boats. Fenders help to prevent damage to boats by hanging off of the boat and acting as a bumper against the dock.

However, boats can still make contact with docks when fenders are displaced from their ideal position to prevent damage. This occurs when waves move the boat into the dock and move the fenders into such position that they can no longer prevent contact between the dock and boat.

The prior art has generally failed to prevent such issues. Boat fenders available on the market can still be displaced from an effective position to protect the surface of a boat. In addition, prior art fender restraint technology focuses on the storage of fenders within a boat, not proper positioning when in use (see, e.g., U.S. Pat. No. 4,773,348). Furthermore, the prior art has concentrated on placing fenders on pier supports, which does not allow for use of holders at positions along docks (see, e.g., U.S. Pat. No. 3,449,917). Therefore, there remains a need for technology to maintain the boat fenders in such position to protect docks and boats from damage.

SUMMARY

The present disclosure relates to a boat fender holder for maintaining boat fenders in position to optimize the protective qualities of the fender. The disclosed fender holders is generally formed to receive a fender and comprises flat extension that allows for the holder to be attached to a dock. In certain aspects, the fender holder defines one or more holes in the flat extension to receive at least one fastener.

Aspects of the disclosed fenders are capable of receiving a multitude of fender sizes and types. For instance, embodiments of the disclosed fenders are able to expand in width or length.

Aspects of the disclosed boat fender assemblies comprise a holder portion and a lip portion such that the lip portion defines one or more holes to receive one or more fasteners. In certain embodiments, the assembly further comprises one or more fasteners (e.g., screws) for securing the assembly to a surface. In some embodiments, the lip portion defines the one or more holes to have threading for receiving the one or more fasteners.

In particular embodiments, the assembly comprises a first and a second material. In some embodiments, the first material is selected from the group consisting of natural rubber, synthetic rubber, polyethylene, polypropylene polystyrene, polyamides, thermoplastics, and polyvinyl chloride. In other embodiments, the first material is a combination of one or more materials selected from the group consisting of natural rubber, synthetic rubber, polyethylene, polypropylene polystyrene, polyamides, thermoplastics, and polyvinyl chloride.

In certain embodiments, the second material is a material that is water-repellant. In more embodiments, the second material is selected from the group consisting of polysiloxanes, Hypalon®, ethylene propylene diene monomer rubber, polyvinyl chloride, and fluoropolymer-based water repellants.

Aspects disclosed herein include methods of securing a boat fender into a proper position on a dock. The methods comprise providing a boat fender holder comprising a holder portion and a lip portion and securing the boat fender holder to a dock by way of fasteners received through one or more holes defined in the lip portion, wherein boat fender holder is secured to the dock. The methods also comprise placing the boat fender into the holder portion interior, wherein the boat fender is kept in place to reduce the likelihood that the boat will contact the dock.

In particular embodiments, the boat fender holder comprises a first material and a second material. In some embodiments, the first material is selected from the group consisting of natural rubber, synthetic rubber, polyethylene, polypropylene polystyrene, polyamides, thermoplastics, and polyvinyl chloride. In other embodiments, the first material is a combination of one or more materials selected from the group consisting of natural rubber, synthetic rubber, polyethylene, polypropylene polystyrene, polyamides, thermoplastics, and polyvinyl chloride. In still other embodiments, the second material is a material that is water-repellant. In yet other embodiments, the second material is selected from the group consisting of polysiloxanes, Hypalon®, EPDM rubber, polyvinyl chloride, and fluoropolymer-based water repellants.

BRIEF DESCRIPTION OF THE DRAWINGS

The present exemplary non-limiting implementation will be described in detail herein with reference to the following drawings, in which like reference numerals refer to like elements, and wherein.

DETAILED DESCRIPTION

The disclosed fender holders allow for fenders to be more effectively used in the protection of boats and docks from damage. The disclosed fender holders position the fenders in a position such that the motion of waves will not displace fenders from an ideal position. Another advantage of the fender holders described herein is that the holders allow for boat operators to leave fenders in their positions at the dock or to bring the boat fenders with them if they so desire. It should be noted that any references, publications, patents, applications, or other materials disclosed herein are incorporated by reference in their entireties unless otherwise specified.

Figure 1:
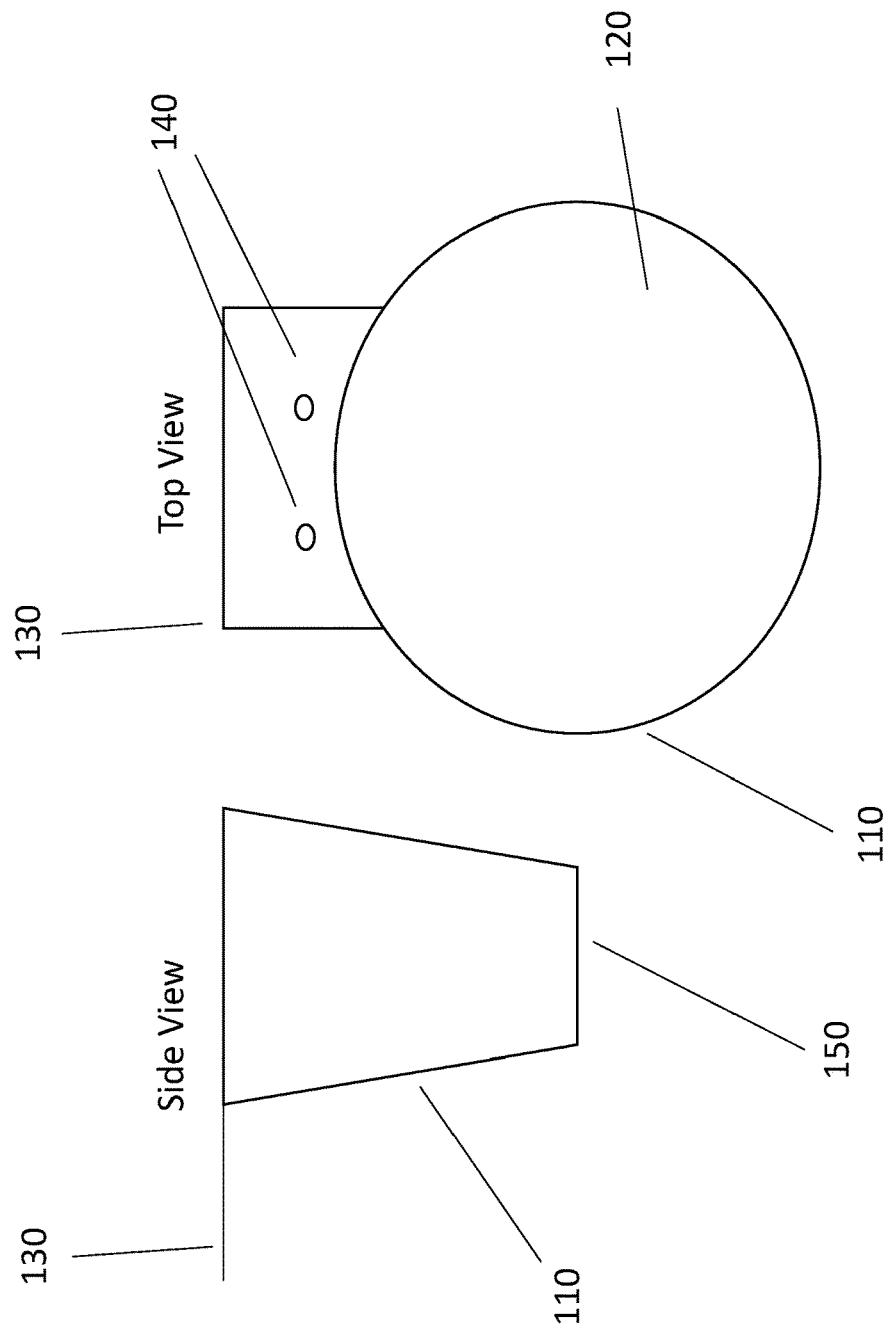
FIG. 1 is a pictorial representation of an embodiment of the disclosed holders showing a side and top view of an exemplary holder.

As shown in FIG. 1, an embodiment of an optionally movable fender holder comprises a holding portion 110 that is conically shaped with a first opening 120 defined at the top of the holder 100 and optionally a second opening 150 defined by the bottom of the holder 100. The holder further comprises a lip portion 130 that is substantially flat (FIG. 1). FIG. 1 also illustrates that the lip portion 130 defines multiple holes 140. The holes 140 allow for fasteners (not shown) to be inserted through the holes to secure the holder to a surface. In some embodiments, the lip portion 130 defines holes 140 comprising threads for receipt of a fastener such as a screw. In particular embodiments, the fasteners are screws. Examples of other types of fasteners include wood screws, machines screws, sheet metal screws, self-drilling SMS screws, hex bolts, carriage bolts, lag bolts, socket screws, set screws, eye lags, wall anchors, and nails. One of ordinary skill in the art will recognize that any fastener can be used so long as the fastener secures the holder to a surface.

The fender holders disclosed herein can be secured to a surface such that the fender holder positions the fender between the boat and the dock to prevent contact between the boat and the dock. For example, the disclosed fender holders can be attached to wood boards in the dock. The attachment can be reversible and allow for undoing of the fasteners from the dock and the removal of the fender holder.

Figure 2:
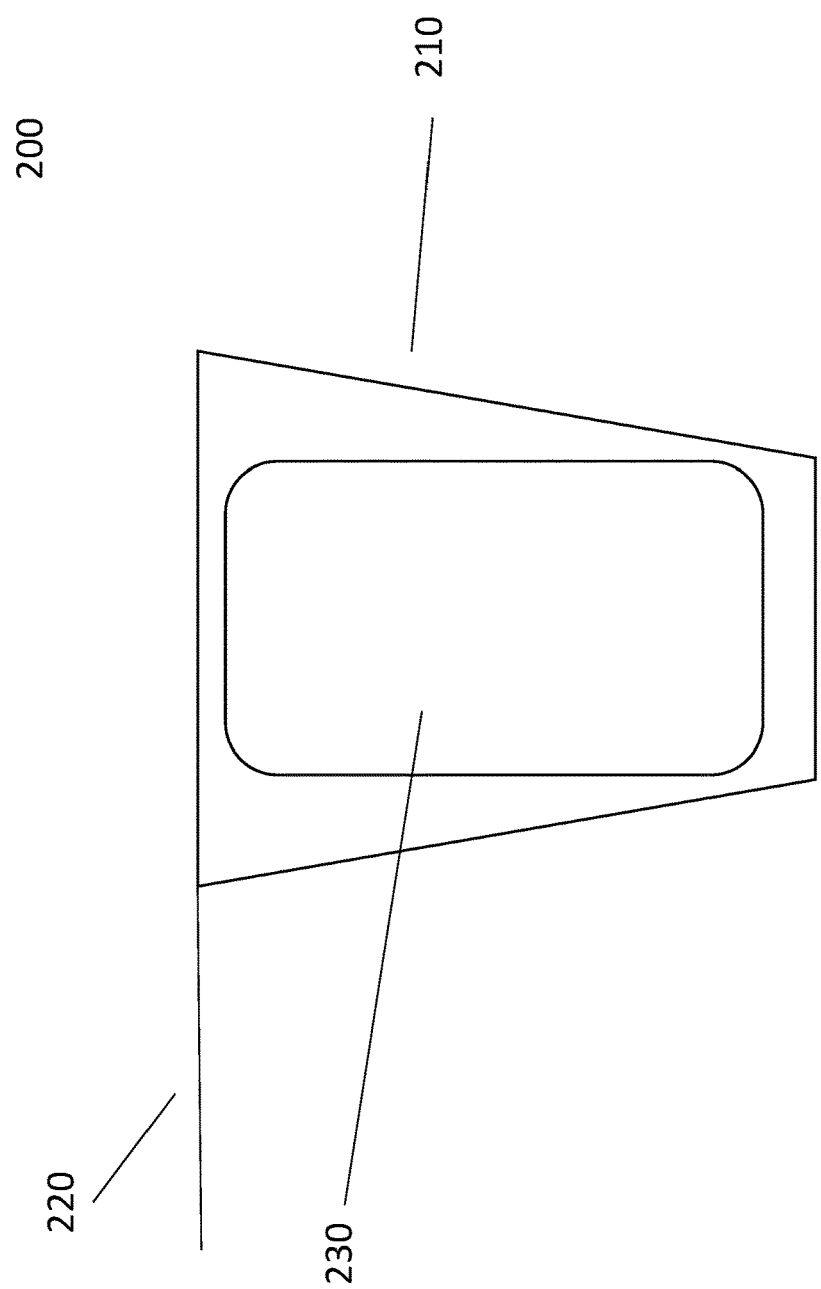
FIG. 2 is a pictorial representation of an exemplary holder with a fender.
Figure 3:
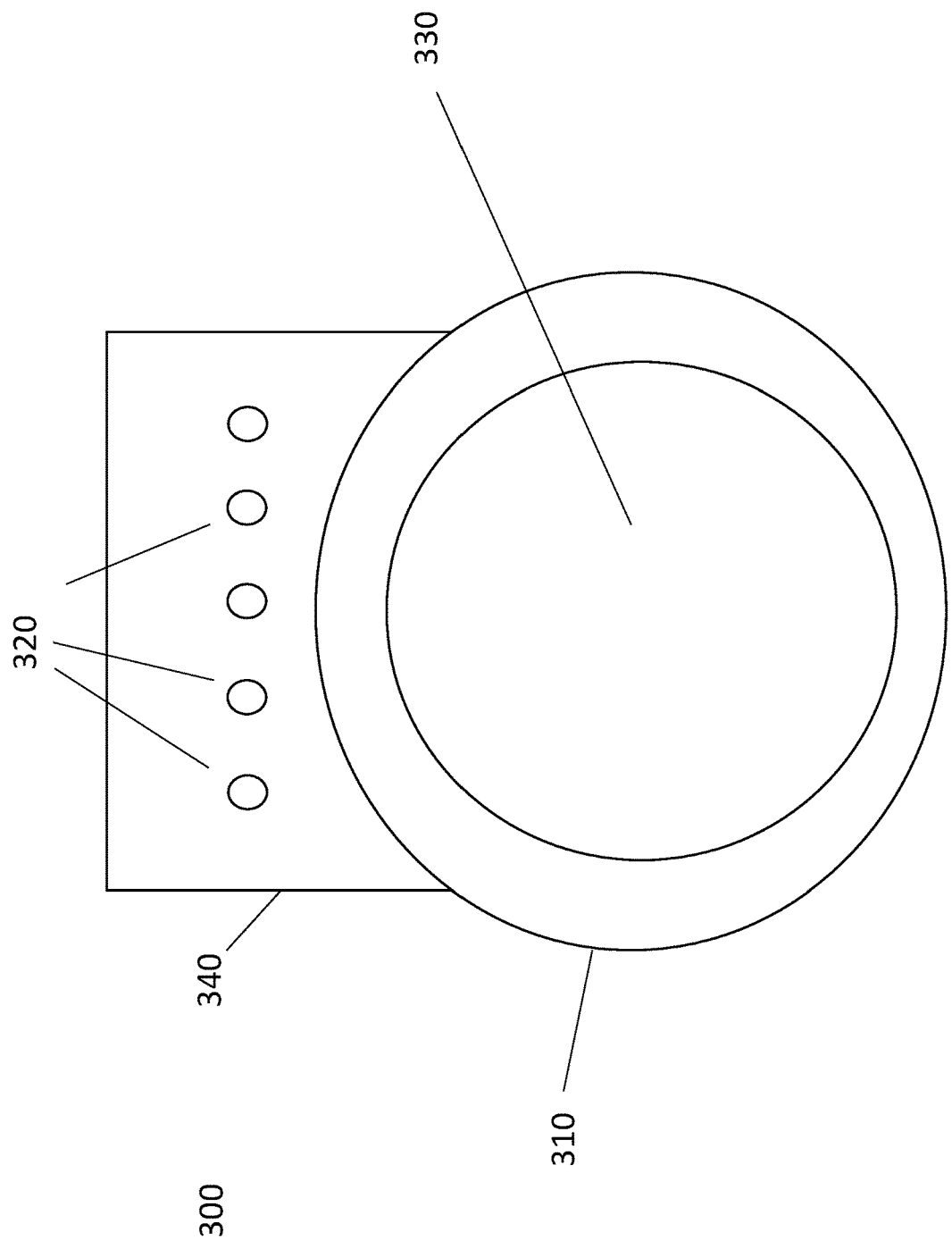
FIG. 3 is a pictorial representation of an exemplary holder from a top view.

FIGS. 2 and 3 show fender holders in which a fender is located within the holder. FIG. 2 shows the embodiment of FIG. 1 where the holder 200 comprises a holder portion 210 and a lip portion 220. The holder 200 is shown with a fender 230 within the conical area of the holder portion 210. In some embodiments, the fender 230 extends outside of the confines of the holder portion 210. As shown in in FIG. 3, the fender holder 300 defines multiple holes 320 defined in the lip portion 340 where fasteners (not shown) are disposed. FIG. 3 further shows a fender 330 disposed within the holder portion 310.

Figure 4:
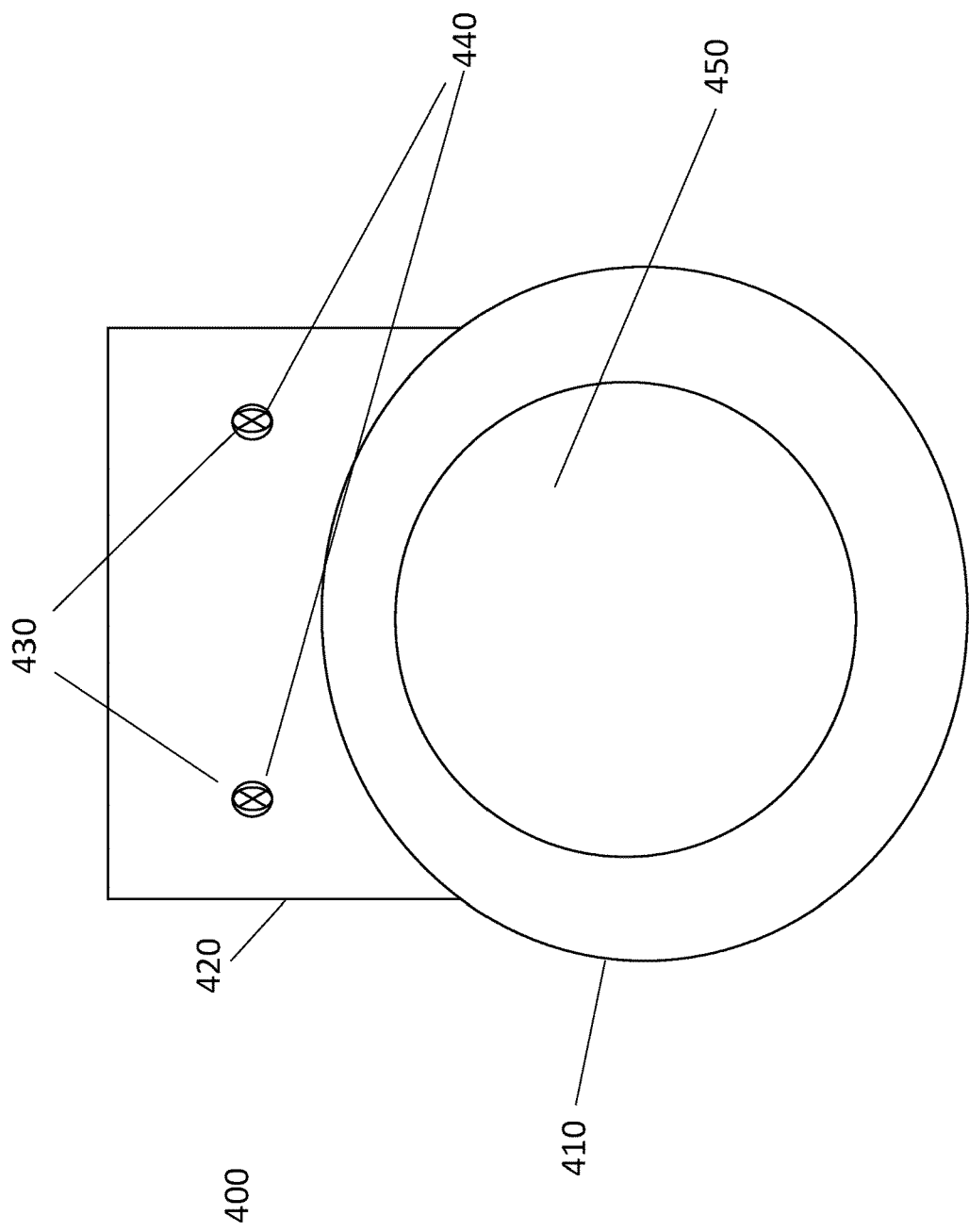
FIG. 4 is a pictorial representation of an exemplary holder from a top view showing a fender and fasteners.
Figure 5:
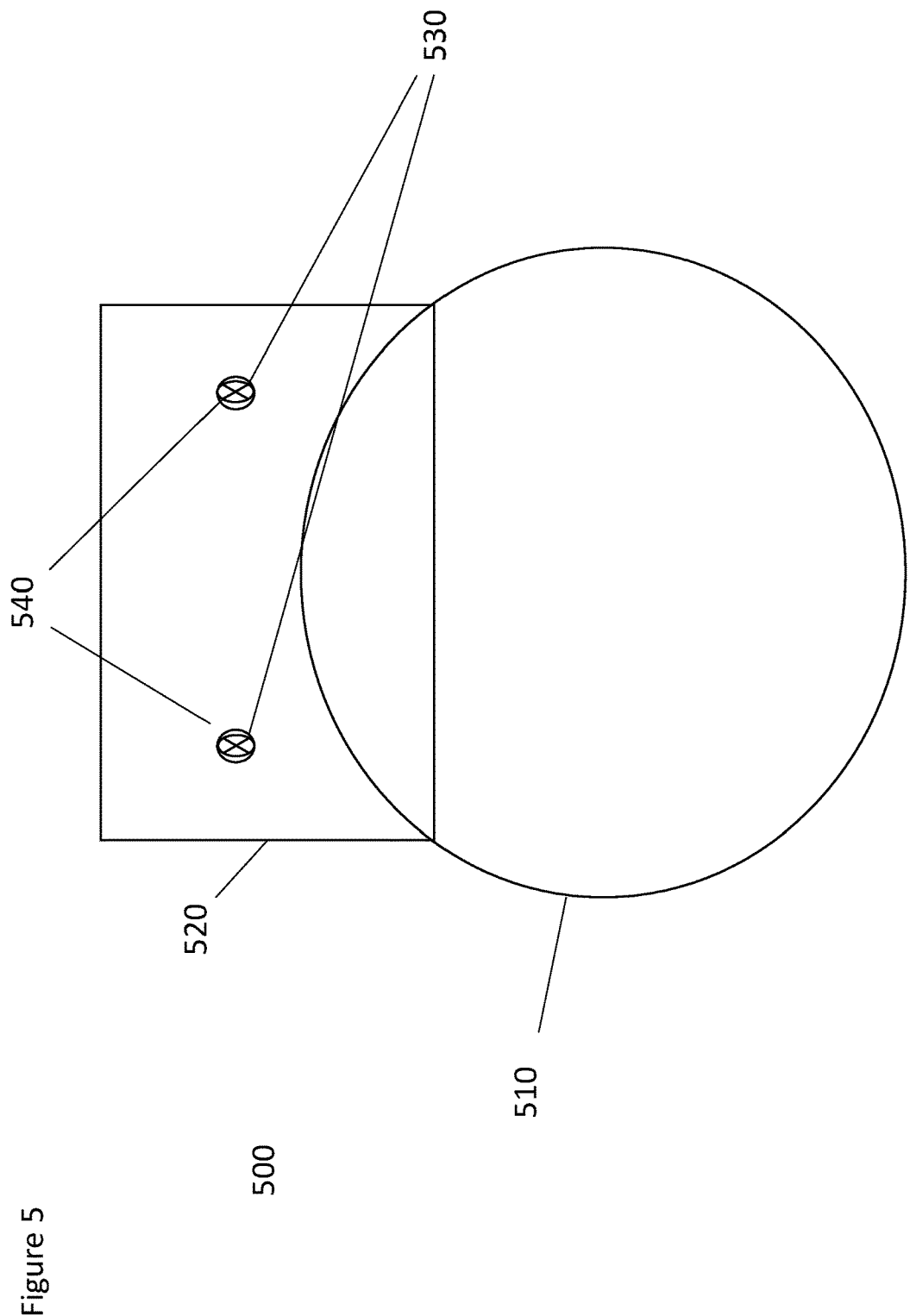
FIG. 5 is a pictorial representation of an exemplary holder from a top view showing fasteners without a fender.

FIG. 4 shows a top-down view of an embodiment of the fender holder 400 comprising the holder portion 410 and lip portion 420. In FIG. 4, the lip portion 420 defines two holes 430 that each receive a fastener (e.g., screw) 440. In certain embodiments, washers placed into position at the holes defined in the lip portion 420 of the fender holder 400. The fender holder 400 shown in FIG. 4 is holding a standard boat fender 450 within the conical area of the holder portion 410. FIG. 5 shows the embodiment of FIG. 4 without a fender in the holder portion 510 of the holder 500, showing a lip portion 520 and fasteners 530 disposed within holes 540 defined in the lip portion 520.

Figure 6:
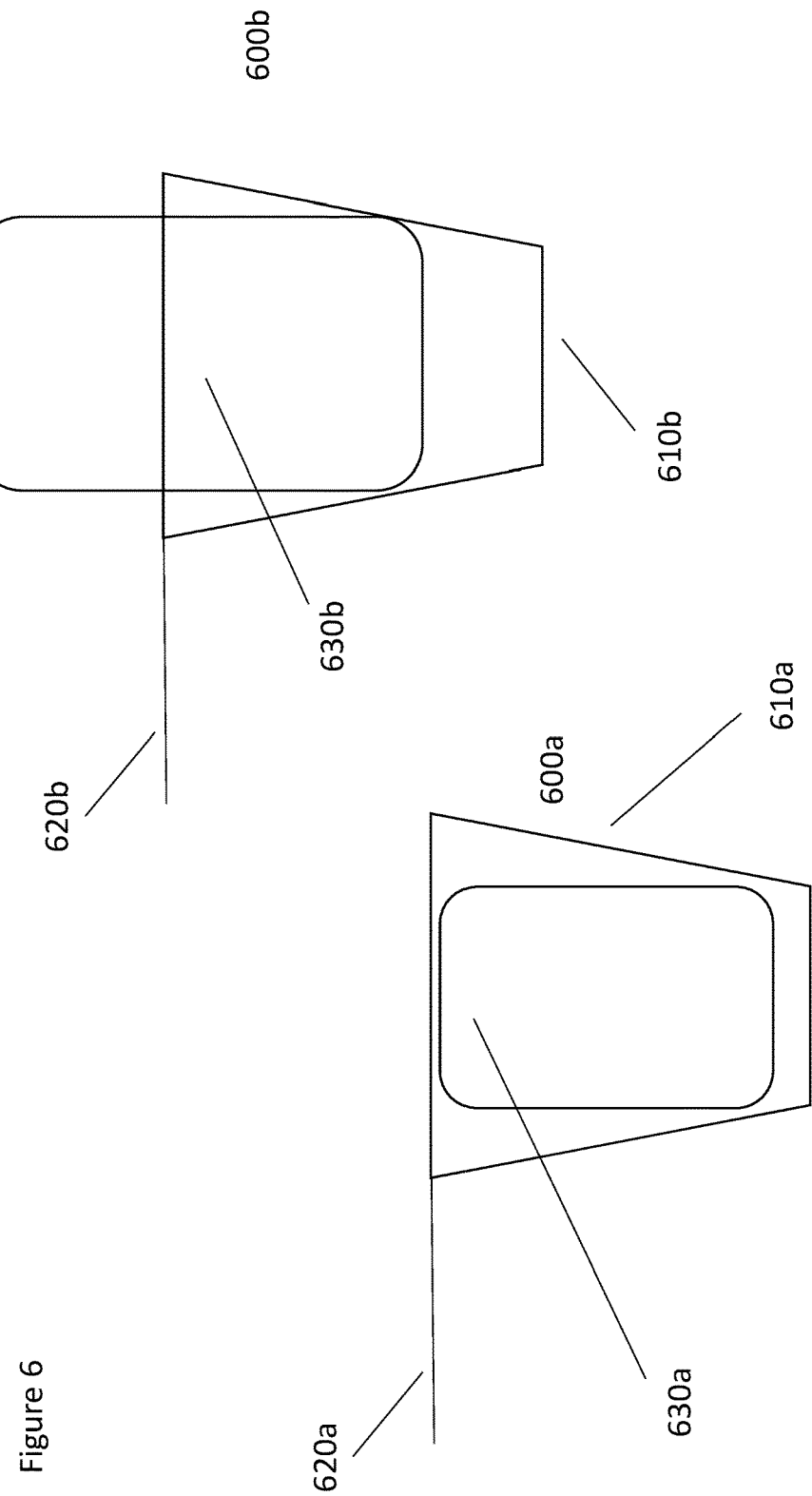
FIG. 6 is a side view representation of holders showing fenders placed at different positions within the fender holder.

FIG. 6 shows two fender holders 600a and 600b each comprising holder portions 610a, 610b and lip portions 620a, 620b. Furthermore, FIG. 6 demonstrates that fenders 630a and 630b can be disposed within the disclosed fender holders at different positions. For instance, the fender can be disposed substantially entirely within the fender holder as in FIG. 4. Alternatively, the fender holder can be disposed with around half 630a or more than half 630b of the fender out of the respective holders 600a and 600b.

Figure 7:
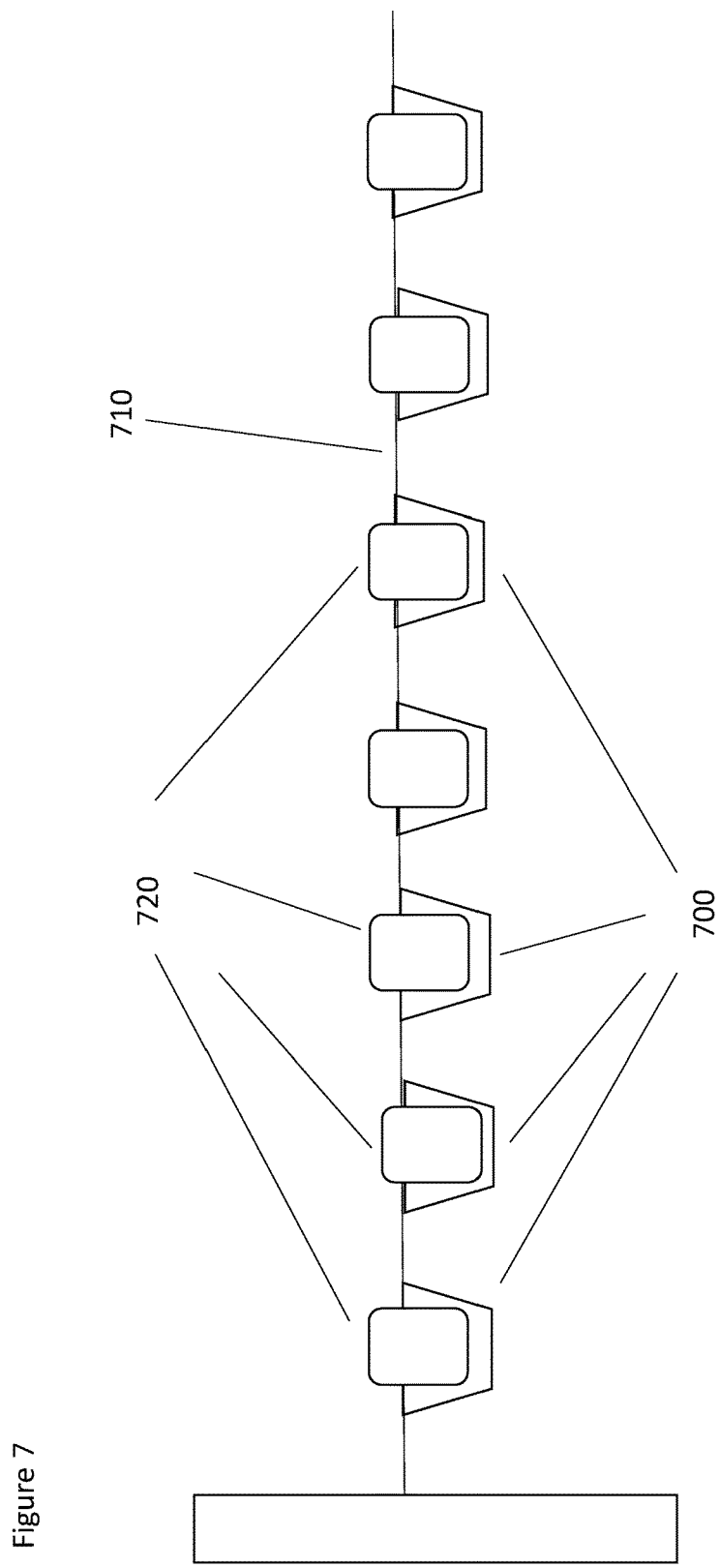
FIG. 7 is a pictorial representation of holders placed on a dock.

As shown in FIG. 7, multiple fender holders 700 may be attached to a single dock 710 to protect one or more boats from damage. The fender holders 700 can be placed at such intervals along the dock 710 such that the fenders 720 prevent any portion of a boat from touching the dock 710. In additional embodiments, the fender holders 700 can positioned along a pier or dock 710 to allow for boat operators to approach the dock and place fenders 720 from their boats into the fender holders 700.

The disclosed fender holders can be made of a multitude of materials. Exemplary materials include natural and synthetic rubber, polyethylene, polypropylene polystyrene, polyamides, thermoplastics, and polyvinyl chloride. The disclosed fenders can comprise a combination of materials to allow for the holders to be flexible and resistant to physical distortion. For instance, the disclosed fenders can comprise a composite material of rubber and plastic to provide resiliency to damage from contact with boat sides, while being flexible so that contact with the fender holder does not damage the boat. In some embodiments, the fender holder further comprises thermosetting polymers or other materials that cure the material.

Figure 8:
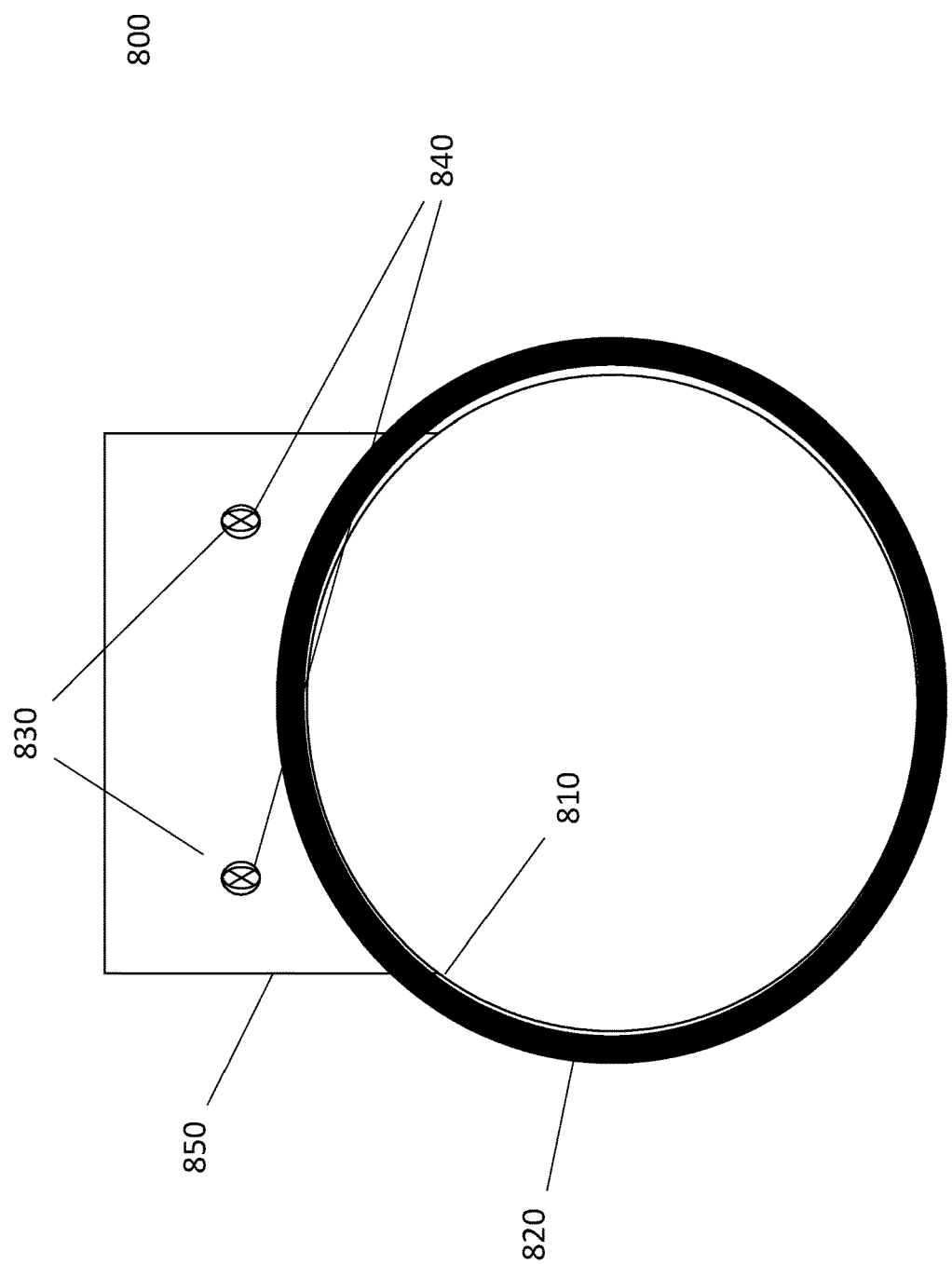
FIG. 8 is a pictorial representation of a holder comprising an outer material coating the exterior of the holder.

It should be noted that the fender holders disclosed herein can further comprise a layer surrounding the exterior of the fender holder. As shown in FIG. 8, the fender holder 800 comprises a first material 810 of polyvinyl chloride that is both flexible and sturdy. The fender holder 800 further comprises a second material 820 that surrounds the first material 810 and protects the material from water penetration. The fender holder 800 further comprises fasteners 840 disposed within holes 830 defined by lip portion 850. In certain embodiments, the second material is polysiloxanes. Other second materials include, but are not limited to, Hypalon®, EPDM rubber, polyvinyl chloride, and fluoropolymer-based water repellants.

The fender holders can be made using one of several known processes. Exemplary processes include injection molding, flow molding, multi-material injection molding, reaction injection molding, rotational molding, and extrusion molding (see, e.g., world wide web at meridianproductscorp.com/index.php/molding; Todd, Robert H.; Allen, Dell K.; Alting, Leo. *Manufacturing Processes Reference Guide*, Industrial Press Inc.: 1994; world wide web at simtec-silicone.com/two-shot-lsr-expertise-and-experience/#sthash.OnyStqeq.dpuf).

Figure 9:
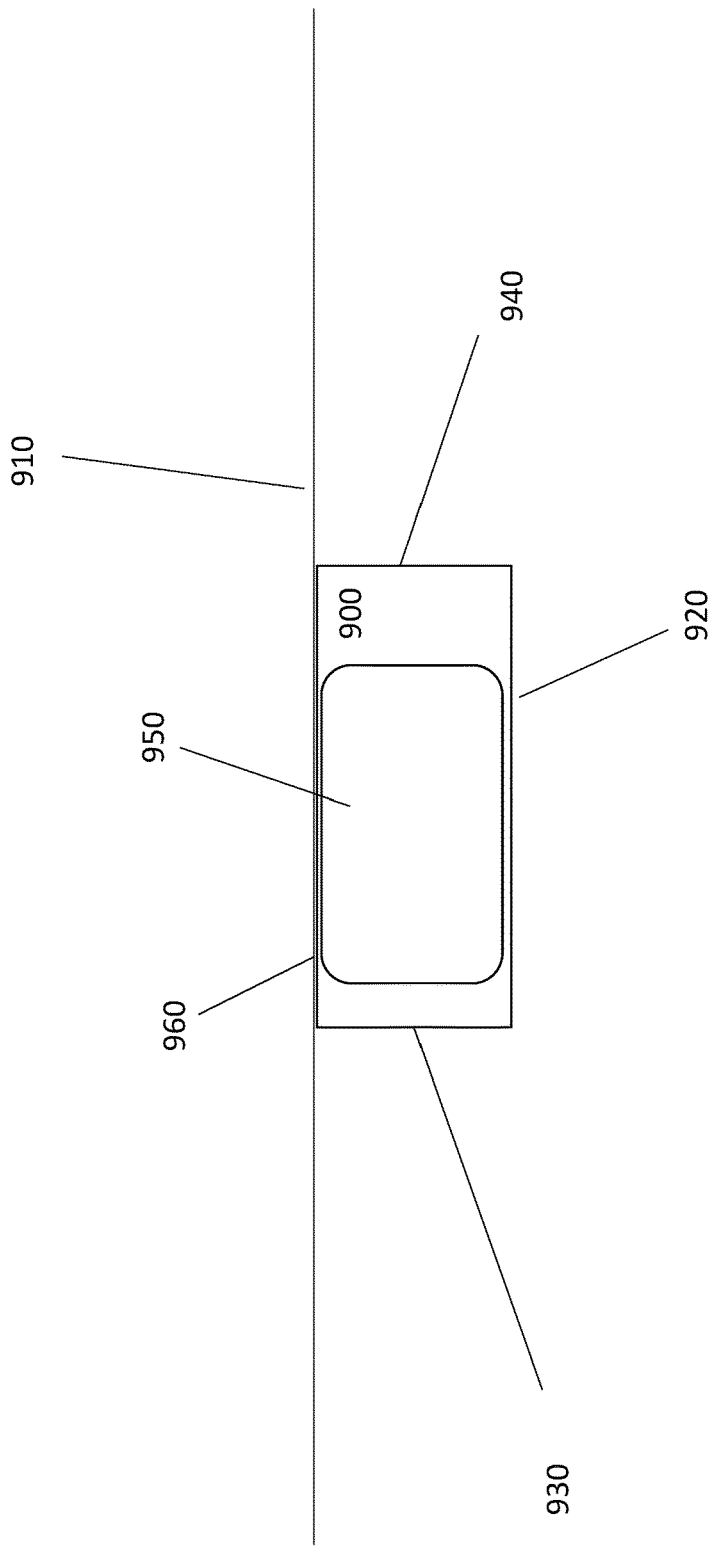
FIG. 9 is a pictorial representation of a fender holder being disposed parallel to the surface of a dock.

FIG. 9 shows another exemplary embodiment of the disclosed fender holders. The fender holder 900 is disposed next to dock 910 such that the fender holder 900 is parallel with the surface of the dock 910. The fender holder 900 comprises a holder portion 920 and a lip portion (not shown) like other holders disclosed herein. The lip portion further defines holes (not shown) such that the holes receive fasteners. The holder 900 further defines a first hole 930 at a first end of the holder 900 and a second hole 940 at a second of the holder 900 allowing insertion of a fender 950 into the holder portion 920. The fender holder 900 also may optionally be configured to have a third hole 960 disposed at the top of the holder 900. In some embodiments, the fender holder 900 comprises only the third hole 960 and the holder 900 defines no holes 930 or 940. It should be noted that the holder 900 can define both holes having the same size or different sizes.

Figure 10:
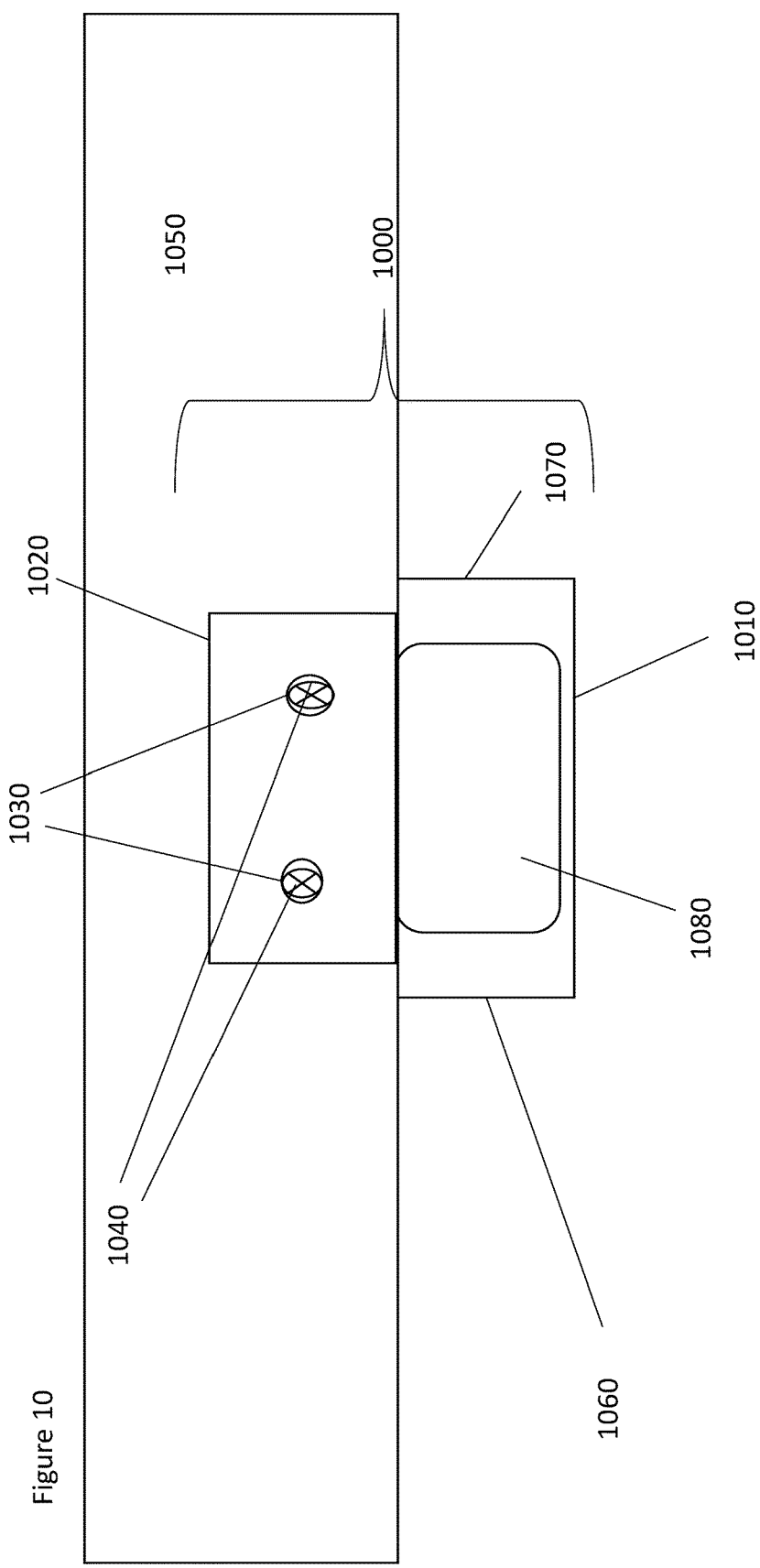
FIG. 10 is a top view representation of a fender holder of FIG. 9 secured to a dock.

FIG. 10 shows a top-view of the fender holder of FIG. 9. The fender holder 1000 comprises a holder portion 1010 and a lip portion 1020. The lip portion 1020 defines holes 1030 where fasteners 1040 fasten the fender holder 1000 to a dock 1050. The holder portion 1010 further comprises a first end 1060 and a second end 1070. In this embodiment, the first end 1060 defines an opening to allow a fender 1080 to be disposed within the holder portion 1010, while the second end 1070 is closed. It should be understood that both ends can be open in certain embodiments.

Figure 11:
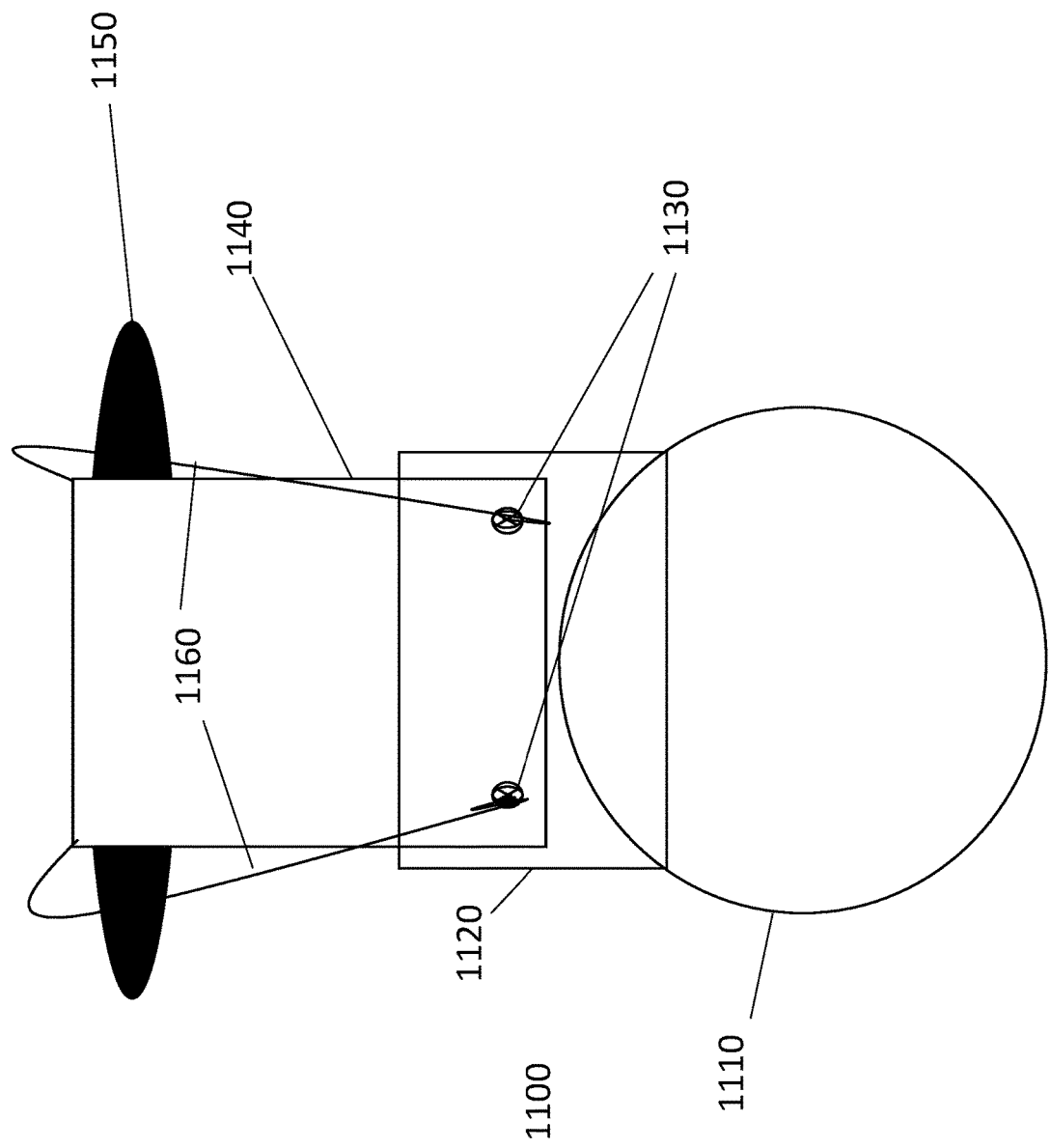
FIG. 11 is a representation of a fender holder comprising a lip extension that hooks around a boat cleat.

FIG. 11 shows a fender holder 1100 comprising a holder portion 1110 and a lip portion 1120. The holder 1100 further comprises a lip extension 1140 that is fastened into the lip portion 1120 by fasteners 1130. The fasteners 1130 can further fasten the fender holder 1100 to the dock. The lip extension 1140 extends to a boat cleat 1150 and wraps around the boat cleat 1150. In certain embodiments, the lip extension 1140 is a flap that fits around an object like a boat cleat. In alternative embodiments, the lip extension 1140 is shaped to fit around the object, such as an oval shape. In particular embodiments, the fender holder 1100 further comprises lip extension fasteners 1160 that fasten the lip extension 1140 to the object such as a boat cleat 1150. In some embodiments, the lip extension fasteners 1160 are wires that are connected to the lip extension 1140 and wrap around the boat cleat 1150 and connect to the fasteners 1130. In some embodiments, the fasteners 1130 are anchors or eyehooks that connect to the lip extension fasteners 1160.

The fender holders disclosed herein can be further designed to mate with particular types of fenders. For instance, the holder 200 of FIG. 2 can be designed to fit the particular contours of the fender 230 disposed in holder portion 210. Thus, if the fender 230 has particular dimensions, the holder 200 can be designed such that the holder portion 210 has the dimensions of the specific fender 230. In addition, if the fender 230 comprises ridges or other structures, the holder 200 can be designed such that the interior of the holder portion 210 can be designed with grooves that mate with the ridges of the fender 230.

In further embodiments, the holder portion of the disclosed fender holders are conical. In other embodiments, the holder portion is square. In still other embodiments, the fender holders are capable of expanded in length by having multiple conical shaped holder portion comprises increasingly narrower cones nested within larger cones to form a telescoping effect. In yet other embodiments, the holder portion is expandable to increase the width of the holder portion.

In still other embodiments, the disclosed fender holder itself protects the boat and dock from damage. The fender holder comprises a flexible rubber or plastic material that acts to bumper the boat from the dock. In particular embodiments, the fender holder comprises additional material to further buffer the boat from the dock.

It should be noted that the use of the term "a" or "an" means "one or more" throughout this application unless explicitly described otherwise.

EQUIVALENTS

Those skilled in the art will recognize, or be able to ascertain, using no more than routine experimentation, numerous equivalents to the specific embodiments described specifically in this disclosure. Such equivalents are intended to be encompassed in the scope of the following claims.

What is claimed:

1. An assembly comprising a holder portion and a lip portion, the holder portion being conically shaped and defining an interior region, the lip extending from the holder portion such that the lip portion is perpendicular to an axis of the holder portion, wherein the holder portion and the lip portion comprise a first material selected from the group consisting of natural rubber, synthetic rubber, polyethylene, polypropylene polystyrene, polyamides, thermoplastics, polyvinyl chloride, and combinations thereof and wherein the lip portion defines one or more holes to receive one or more fasteners for fastening the assembly to a dock and the holder portion is configured to maintain its shape such that a boat fender can be received by the holder portion and the boat fender maintains its position relative to the dock and a boat.

2. The assembly of claim 1 further comprising one or more fasteners for securing the assembly to a surface.

3. The assembly of claim 1, wherein the one or more fasteners are screws.

4. The assembly of claim 1, wherein the lip portion defines the one or more holes to have threading for receiving the one or more fasteners.

5. The assembly of claim 1, wherein the assembly comprises a first material.

6. The assembly of claim 1, wherein the first material is a combination of one or more materials selected from the group consisting of natural rubber, synthetic rubber, polyethylene, polypropylene polystyrene, polyamides, thermoplastics, and polyvinyl chloride.

7. The assembly of claim 5, wherein the assembly is coated with a second material.

8. The assembly of claim 7, wherein the second material is a material that is water-repellant.

9. The assembly of claim 7, wherein the second material is selected from the group consisting of polysiloxanes, chlorosulfonated polyethylene synthetic rubber ethylene propylene diene monomer rubber, polyvinyl chloride, and fluoropolymer-based water repellants.

10. A method securing a boat fender into a proper position on a dock, the method comprising:
    a) providing a boat fender holder comprising a holder portion and a lip portion, the holder portion being conically shaped and defining an interior region, the lip extending from the holder portion such that the lip portion is perpendicular to an axis of the holder portion, wherein the holder portion and the lip portion comprise a first material selected from the group consisting of natural rubber, synthetic rubber, polyethylene, polypropylene polystyrene, polyamides, thermoplastics, polyvinyl chloride, and combinations thereof;
    b) securing the boat fender holder to a dock by way of fasteners received through one or more holes defined in the lip portion, wherein boat fender holder is secured to the dock; and
    c) placing the boat fender into the holder portion interior, wherein the boat fender is kept in place to reduce the likelihood that the boat will contact the dock and wherein the holder portion is configured to maintain its shape such that a boat fender can be received by the holder portion and the boat fender maintains its position relative to the dock and a boat.

11. The method of claim 10, wherein the first material is selected from the group consisting of natural rubber, synthetic rubber, polyethylene, polypropylene polystyrene, polyamides, thermoplastics, and polyvinyl chloride.

12. The method of claim 10, wherein the first material is a combination of one or more materials selected from the group consisting of natural rubber, synthetic rubber, polyethylene, polypropylene polystyrene, polyamides, thermoplastics, and polyvinyl chloride.

13. The method of claim 10, wherein the boat fender holder comprises a second material, the second material being coated on an exterior of the boat fender holder.

14. The method of claim 13, wherein the second material is a material that is water-repellant.

15. The method of claim 13, wherein the second material is selected from the group consisting of polysiloxanes, chlorosulfonated polyethylene synthetic rubber ethylene propylene diene monomer rubber, polyvinyl chloride, and fluoropolymer-based water repellants.

* * * * *